US011409018B2

(12) United States Patent
Salazar David

(10) Patent No.: US 11,409,018 B2
(45) Date of Patent: Aug. 9, 2022

(54) SYSTEM AND METHOD FOR MONITORING A BALLOONING POTENTIAL OF A WELLBORE

(71) Applicant: HALLIBURTON ENERGY SERVICES, INC., Houston, TX (US)

(72) Inventor: Harold Jose Salazar David, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 655 days.

(21) Appl. No.: 16/346,083

(22) PCT Filed: May 18, 2018

(86) PCT No.: PCT/US2018/033512
§ 371 (c)(1),
(2) Date: Apr. 29, 2019

(87) PCT Pub. No.: WO2019/221757
PCT Pub. Date: Nov. 21, 2019

(65) Prior Publication Data
US 2021/0325562 A1     Oct. 21, 2021

(51) Int. Cl.
*E21B 21/08* (2006.01)
*E21B 47/117* (2012.01)
*G01V 3/18* (2006.01)

(52) U.S. Cl.
CPC ............... *G01V 3/18* (2013.01); *E21B 21/08* (2013.01); *E21B 47/117* (2020.05)

(58) Field of Classification Search
CPC ........ E21B 21/08; E21B 47/10; E21B 47/117; G01V 3/18
See application file for complete search history.

(56) References Cited

U.S. PATENT DOCUMENTS

| 6,234,250 B1* | 5/2001 | Green | E21B 21/08 |
| | | | 166/250.03 |
| 2009/0194330 A1* | 8/2009 | Gray | E21B 21/00 |
| | | | 175/24 |

(Continued)

FOREIGN PATENT DOCUMENTS

| WO | WO-2016040310 A1 * | 3/2016 | ............. E21B 47/09 |
| WO | WO-2017059153 A1 | 4/2017 | |

OTHER PUBLICATIONS

Korean Intellectual Property Office, International Search Report and Written Opinion, PCT/US2018/033512, dated Feb. 15, 2019, 11 pages, Korea.

*Primary Examiner* — Matthew R Buck
(74) *Attorney, Agent, or Firm* — Haynes and Boone, LLP

(57) ABSTRACT

A method for operating a wellbore system for producing hydrocarbons from a wellbore in an underground formation in which a working fluid is circulated through the wellbore during operation. The method includes detecting a loss of the working fluid, allocating the loss to one or more layers of the underground formation, determining a ballooning potential of the wellbore based on the allocated loss and a lithology of the one or more layers of the underground formation, detecting an increase in a return flow of the working fluid from the wellbore, and comparing the increase in the return flow to the ballooning potential of the wellbore to determine whether the increase in the return flow is due to an influx of formation fluid into the wellbore. Remedial action may be taken in response to a determination that the increase in the return flow is due to an influx of formation fluid.

20 Claims, 5 Drawing Sheets

(56) References Cited

U.S. PATENT DOCUMENTS

| | | | | |
|---|---|---|---|---|
| 2013/0299241 A1* | 11/2013 | Alberty | .................. | E21B 47/10 |
| | | | | 175/50 |
| 2013/0299242 A1* | 11/2013 | Veeningen | ............ | E21B 47/113 |
| | | | | 175/50 |
| 2014/0291023 A1* | 10/2014 | Edbury | .................. | E21B 21/08 |
| | | | | 175/24 |
| 2017/0081931 A1* | 3/2017 | Milner | .................... | E21B 21/08 |
| 2017/0145822 A1* | 5/2017 | Rowe | .................... | E21B 49/003 |
| 2017/0314382 A1* | 11/2017 | Torrione | ................. | E21B 21/08 |
| 2017/0328200 A1* | 11/2017 | Forstner | ................ | E21B 49/005 |

* cited by examiner

SYSTEM AND METHOD FOR MONITORING A BALLOONING POTENTIAL OF A WELLBORE

CROSS-REFERENCE TO RELATED APPLICATIONS

This application is a U.S. national stage patent application of International Patent Application No. PCT/US2018/033512, filed on May 18, 2018, the benefit of which is claimed and the disclosure of which is incorporated herein by reference in its entirety.

TECHNICAL FIELD

Embodiments of the present disclosure relate generally to wellbore operations and more specifically to monitoring a ballooning potential of a wellbore during wellbore operations.

BACKGROUND

In many wellbore systems, working fluids, such as drilling fluids, are circulated through a wellbore for a variety of purposes. For example, drilling fluids are used to lubricate and/or cool the drilling bit of the wellbore system during drilling operations. In many applications, working fluids may fill up the wellbore to prevent formation fluids from entering the wellbore. Other purposes of working fluids include carrying debris to the surface, which may be analyzed to obtain an understanding of the downhole environment.

At times, the return flow of working fluids to the surface of the wellbore system may increase unexpectedly. In some cases, the increase in the return flow may indicate an influx of formation fluids into the wellbore. For example, an influx may occur when the well is underbalanced (e.g., the working fluid is less dense than the surrounding formation fluid), creating a pressure gradient that allows formation fluids to enter the wellbore. The uncontrolled influx of formation fluids into the wellbore can result in serious safety breaches and/or equipment damage. Consequently, various mechanisms are used to mitigate the risks associated with the influx of formation fluids, such as blowout preventers. However, activating such mechanisms (e.g., sealing a wellbore with a blowout preventer and/or increasing the density of the working fluids) may have adverse consequences on the operational efficiency of a wellbore system, perhaps even resulting in permanent closure of the well. Accordingly, analysts and/or operators of the wellbore system may be asked to interpret a detected increase in the return flow to determine whether potentially costly mitigation efforts are justified. But the interpretation often comes down to a human judgment call, which is prone to accuracy and/or repeatability issues.

Accordingly, it is desirable to provide a wellbore: system that implements improved techniques for interpreting an increase the return flow of drilling fluids from a wellbore.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
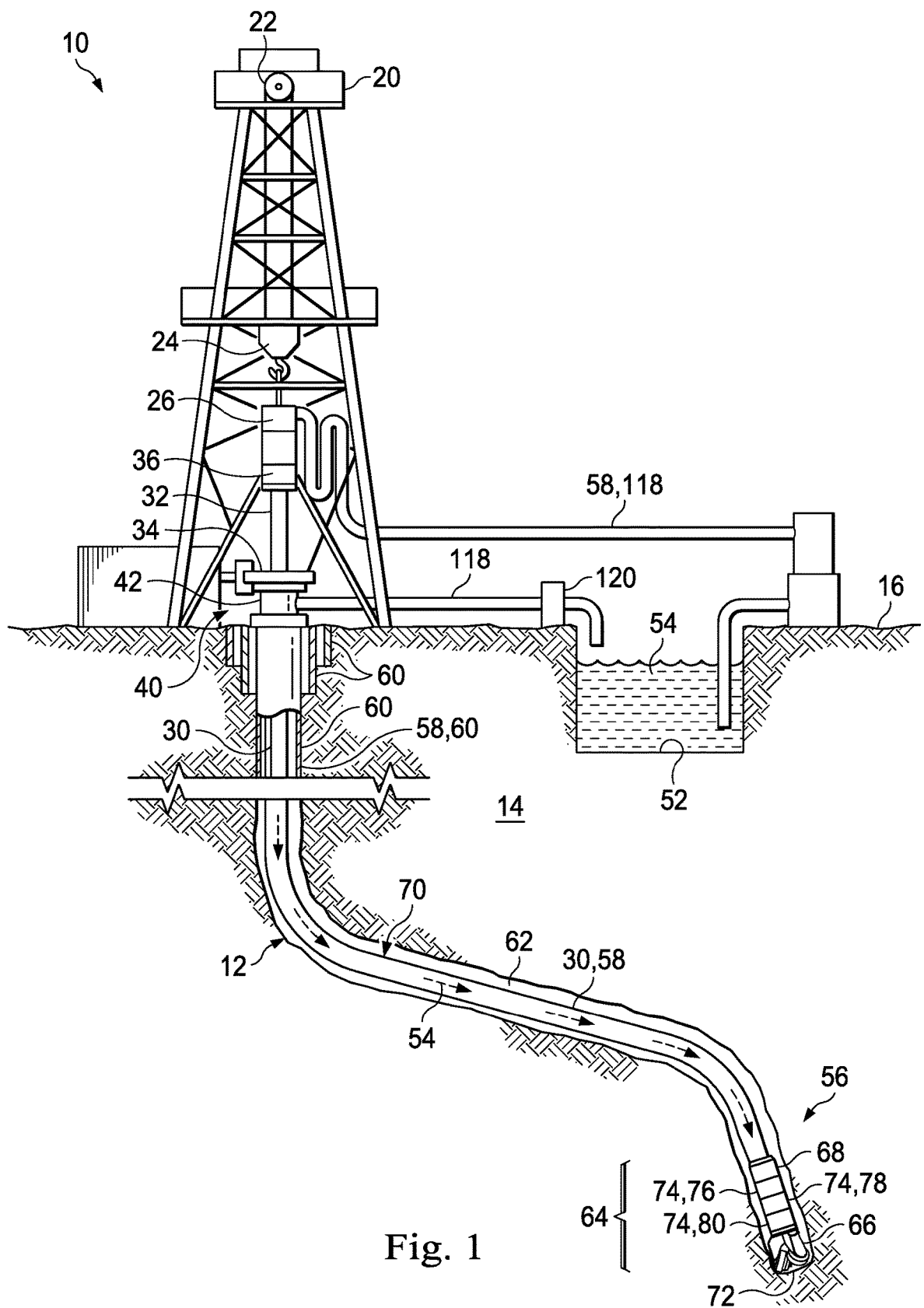
FIG. 1 illustrates an elevation view in partial cross-section of a wellbore system for drilling and/or production according to some embodiments.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an onshore operation, it should be understood by those skilled in the art that the apparatus according to the present disclosure is equally well suited for use in offshore operations and vice-versa. Further, unless otherwise noted, even though a Figure may depict a cased hole, it should be understood by those skilled in the art that the apparatus according to the present disclosure is equally well suited for use in open hole operations.

Generally, in one or more embodiments, a wellbore system is provided wherein a ballooning potential of the wellbore is monitored. Ballooning generally occurs when working fluids circulating through a wellbore are temporarily lost to the surrounding formation, and are later returned to the wellbore from the formation. When the lost fluid returns to the wellbore, an increase in the return flow of the working fluid to the surface results. While ballooning can result in an increase in return flow that is generally benign, the increase in return flow may be confused for an influx of formation fluid (as opposed to drilling fluid) into the wellbore, which influx could impact the operational efficiency of the wellbore system and/or may require closure of the wellbore system. Accordingly, the wellbore system of the present disclosure is adapted to monitor the ballooning potential of the wellbore to better distinguish between ballooning events and the influx of formation fluid, resulting in higher operating efficiency and/or reduced instances of unnecessary closures.

Turning to FIG. 1, shown is an elevation view in partial cross-section of a wellbore system 10 for drilling and/or production. In some embodiments, wellbore system 10 may be utilized to produce hydrocarbons from a wellbore 12 extending through various earth strata in a formation 14 located below the earth's surface 16 (e.g., an underground formation containing extractable hydrocarbons). Wellbore 12 may be formed of a single or multiple bores extending into formation 14, and disposed in any orientation (e.g., horizontal, vertical, slanted, multilateral, and/or the like).

Wellbore system 10 includes a drilling rig 20 (which may also be referred to as a derrick). Drilling rig 20 may include a hoisting apparatus 22, a travel block 24, and a swivel 26 for raising and lowering a drilling string 30 and/or other types of conveyance vehicles, which may include casing, drill pipe, coiled tubing, production tubing, other types of pipe or tubing strings, wireline, slickline, and the like. In FIG. 1, drilling string 30 is a substantially tubular, axially extending drill string formed of a plurality of drill pipe joints coupled together end-to-end. Drilling rig 20 may include a kelly 32, a rotary table 34, and other equipment associated with rotation and/or translation of drilling string 30 within wellbore 12. For some applications, drilling rig 20 may also include a top drive unit 36.

Drilling rig 20 may be located proximate to a wellhead 40 as shown in FIG. 1, or spaced apart from wellhead 40, such as in the case of an offshore drilling systems. One or more pressure control devices 42, such as blowout preventers (BOPs) and other equipment associated with drilling or producing a wellbore may also be provided at wellhead 40 or elsewhere in wellbore system 10.

Although wellbore system 10 of FIG. 1 is illustrated as being a land-based system, wellbore system 10 of FIG. 1 may be deployed offshore.

A working fluid vessel 52, such as a storage tank, a pit (e.g., a mud pit), container and/or the like, may supply and/or collect a working fluid 54. During wellbore operations, working fluid 54 may be circulated through wellbore 12, e.g., by being pumped into the upper end of drilling string 30, flowing downhole through the interior of drilling string 30, exiting drilling string 30 at the bottom of wellbore 12, and returning uphole through wellbore 12 along the exterior of drilling string 30. Working fluid vessel 52 may be a source to supply any fluid utilized in wellbore operations, including without limitation, drilling fluid (or "drilling mud"), cementious slurry, acidizing fluid, liquid water, steam or some other type of fluid.

Wellbore system 10 may include subsurface equipment 56 disposed in wellbore 12, such as, for example, a drill bit and bottom hole assembly (BHA), a completion assembly or some other type of wellbore tool.

Wellbore system 10 may generally be characterized as having a pipe system 58. For purposes of this disclosure, pipe system 58 may include casing, risers, tubing, drill strings, completion or production strings, subs, heads or any other pipes, tubes or equipment that attaches to and/or extends through the foregoing, such as drilling string 30, as well as the wellbore and laterals in which the pipes, casing and/or strings may be deployed. In this regard, pipe system 58 may include one or more casing strings 60 that may be cemented in wellbore 12, such as the surface, intermediate and production casings strings 60 shown in FIG. 1. An annulus 62 is formed between the walls of sets of adjacent tubular components, such as concentric casing strings 60 or the exterior of drilling string 30 and the inside wall of wellbore 12 or casing strings 60, as the case may be.

Where subsurface equipment 56 is used for drilling operations, the lower end of drilling string 30 may include and/or be coupled to a bottom hole assembly 64, which may carry at a distal end a drill bit 66. During drilling operations, weight-on-bit (WOB) is applied as drill bit 66 is rotated, thereby enabling drill bit 66 to engage formation 14 and drill wellbore 12 along a predetermined path toward a target zone. In general, the torque to rotate drill bit 66 may be supplied by drilling rig 20 (e.g., from top drive unit 36 and/or rotary table 34) and transmitted downhole via drilling string 30, and/or may be supplied by a downhole mud motor 68 of bottom hole assembly 64. Working fluid 54 is pumped to the upper end of drilling string 30, flows through a longitudinal interior 70 of drilling string 30 through bottom hole assembly 64, and exits from nozzles formed in drill bit 66. At a bottom end 72 of wellbore 12, working fluid 54 may mix with formation cuttings, formation fluids, and other downhole fluids and debris. The resulting fluid mixture may then flow upwardly through annulus 62 to return formation cuttings and other downhole debris to the surface 16.

Bottom hole assembly 64 and/or drilling string 30 may include various other downhole tools, such as a power source 76, mechanical subs 78 such as directional drilling subs, and measurement equipment 80, such as measurement while drilling (MWD) and/or logging while drilling (LWD) instruments, detectors, circuits, or other equipment to provide information about wellbore 12 and/or formation 14, such as logging or measurement data from wellbore 12. Measurement data and other information from the downhole tools may be communicated using electrical signals, acoustic signals or other telemetry signals that can be converted to electrical signals at drilling rig 20 to, among other things, monitor the performance of drilling string 30, bottom hole assembly 64, and/or drill bit 66, as well as monitor the conditions of the environment to which the bottom hole assembly 64 is subjected. Fluids, cuttings and other debris returning to surface 16 from wellbore 12 may be directed by a flow line 118 to a processing system 120, which may include shakers, centrifuges and the like. The processed fluids may then be returned to working fluid vessel 52.

Figure 2A:
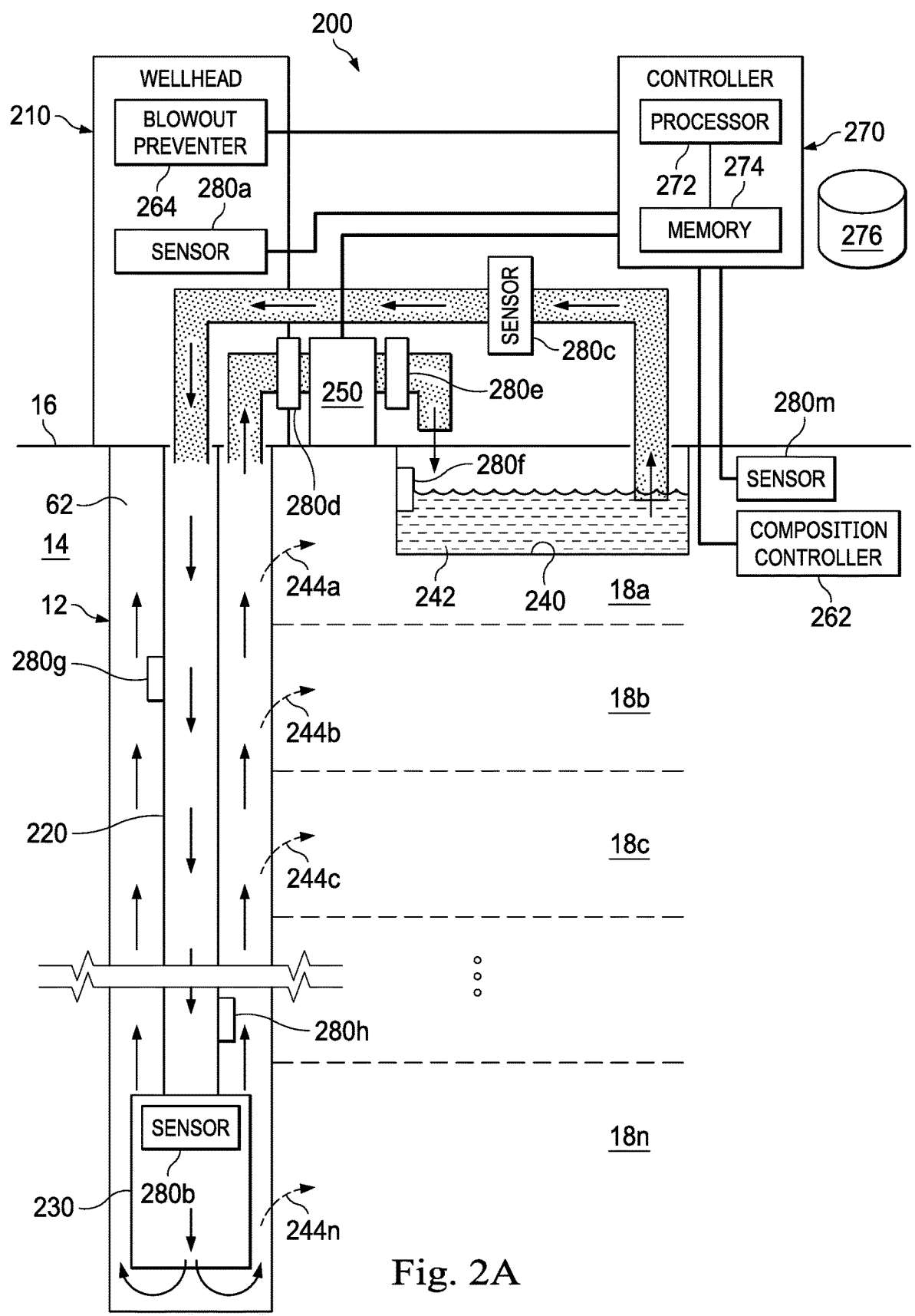
FIGS. 2A-2C illustrate an elevation view in partial cross-section of a wellbore system for drilling and/or production according to some embodiments
Figure 2B:
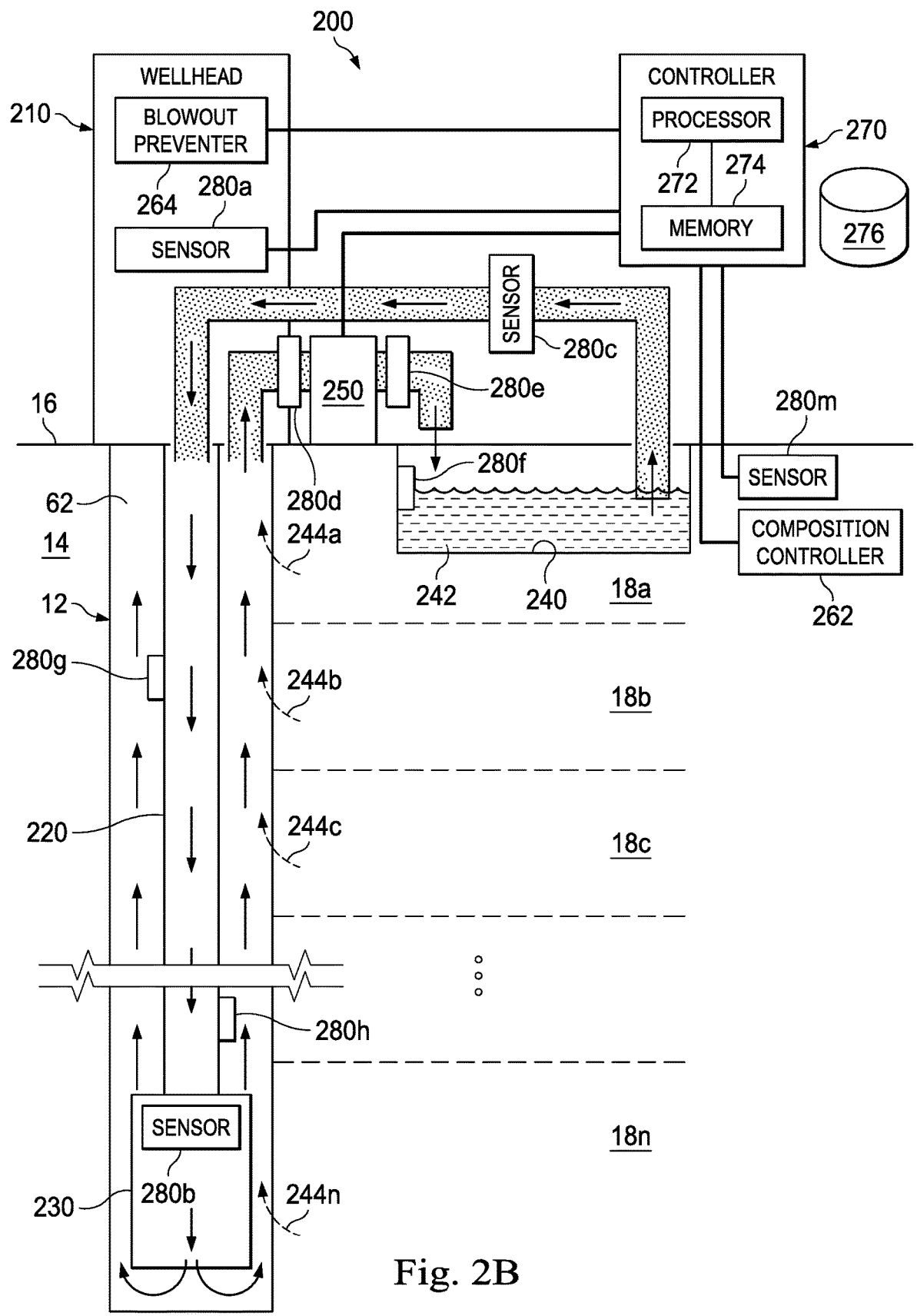
Figure 2C:
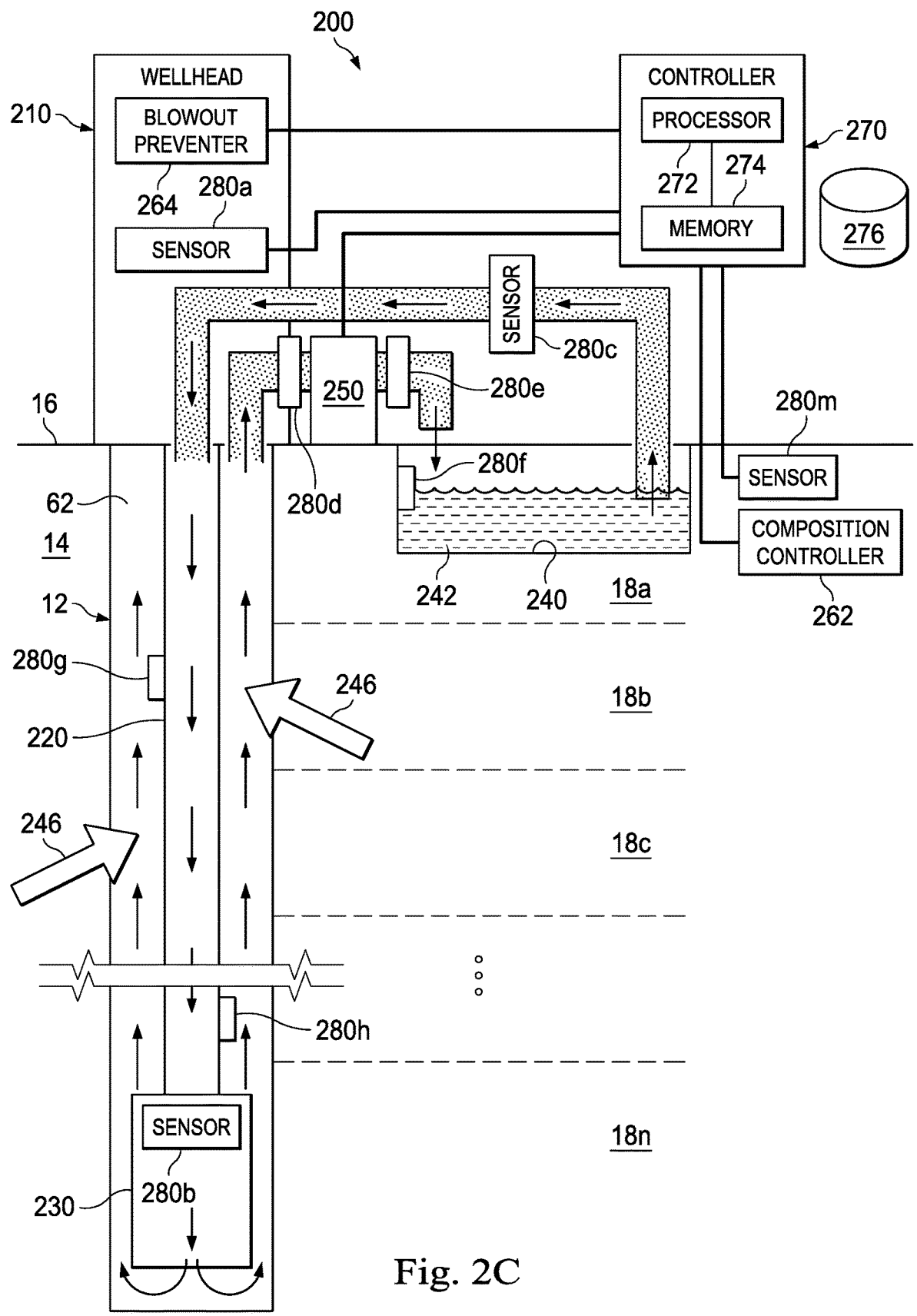

Turning to FIGS. 2A-2C, shown are elevation views in partial cross-section of a wellbore system 200 for drilling and/or production according to some embodiments. In some embodiments consistent with FIG. 1, wellbore system 200 may generally correspond to wellbore system 10. Consistent with such embodiments, wellbore system 200 may be utilized to produce hydrocarbons from a wellbore 12 extending through various earth strata in a formation 14 (e.g., an oil and/or gas formation) located below the earth's surface 16. As depicted in FIG. 2, formation 14 may have a plurality of geologic layers 18a-n through which wellbore 12 extends. Each of layers 18a-n may generally have different lithological features (e.g., one of layers 18a-n may correspond to a shale formation, another layer may correspond to a sandstone formation, etc.).

Wellbore system 200 may include a wellhead 210, a drilling string 220, a drilling bit 230, and a working fluid vessel 240 for supplying and/or collecting working fluid 242, which generally correspond to similarly labeled features of FIG. 1. As discussed previously with reference to FIG. 1, during drilling operation, working fluid 242 is circulated between working fluid vessel 240 and drilling bit 230. For example, during drilling operation, working fluid 242 may be pumped downhole through an interior channel of drill string 220 and may return uphole through annulus 62. It will be appreciated that wellbore 12 as depicted in FIGS. 2A and 2B is incased, and thus, during the return trip, working fluid 242 may mix with formation cuttings, formation fluids, and other downhole fluids and debris. A processing system 250 may remove and/or analyze such impurities before working fluid 242 is returned to working fluid vessel 240.

As depicted in FIGS. 2A and 2B, some of working fluid 242 with wellbore 12 may temporarily enter formation 14 rather than circulating back to working fluid vessel 240 through annulus 62. At a later time, this portion of working fluid 242 may flow back into wellbore 12 from formation 14, a phenomena is referred to as "ballooning." FIGS. 2A and 2B depict ballooning volumes 244a-n corresponding to working fluid 242 flowing into and out of various layers 18a-n of formation 14. The amount of ballooning volumes 244a-n may depend on a variety of factors, such as the composition of working fluid 242, the lithology and/or geology of layers 18a-n, the porosity of layers 18a-n, wellbore breathing (e.g., changes to the shape of wellbore 12 over time), the presence of fractures and/or microfractures, and/or the like.

As depicted in FIG. 2C, ballooning is to be distinguished from influx of formation fluid 246 (e.g., water, oil, and/or gas from formation 14) into wellbore 12. Influx of formation fluid 246 may occur when wellbore 12 is underbalanced, i.e., the density (and/or weight) of working fluid 242 is less than the density of formation fluid 246. Left unchecked, the influx of formation fluid 246 may result in a well control event (e.g., an uncontrolled release of fluids from wellbore 12), such as a blowout, kick, and/or the like.

Whereas ballooning is generally a benign occurrence from an operational standpoint, the influx of formation fluid 246 into wellbore 12 may cause equipment damage and down time. Accordingly, efforts to mitigate and/or control the influx of formation fluid 246 may significantly impact the operation of wellbore system 200. Thus, wellbore system 200 may include a composition controller 262 that controls the composition of working fluid 242, including the density of working fluid 242. In response to detecting an influx of formation fluid 246, composition controller 262 may increase the density of working fluid 242 to restore equilibrium between working fluid 242 and formation fluid 246. Similarly, wellbore system 200 may include a blowout preventer 264 that seals wellbore 12 in response to a well control event to prevent or mitigate the uncontrolled release of fluid from wellbore 12.

Efforts to mitigate and/or control the influx of formation fluid 246 into wellbore 12 may likewise have adverse impacts on the operation and/or efficiency of wellbore system 200. For example, increasing the density of working fluid 242 may cause or contribute to differential sticking, caving of wellbore 12 due to overbalance (which occurs when the density of working fluid 242 is greater than the density of formation fluid 246), a decrease in the rate of penetration (ROP) of drilling bit 230, an increase in operating costs (e.g., energy costs associated with processing and pumping working fluid 242), and/or the like. Similarly, sealing wellbore 12 with blowout preventer 264 may result in temporary or permanent closure of wellbore 12, a shut in well, and/or the like. In the case of a permanent well closure, all or most of the investment in wellbore system 200 may be lost, and the potential production of the well may be unrealized.

Thus, while mitigation efforts may be required in response to a detected influx of formation fluid 246, ballooning generally does not require such mitigation efforts and/or their associate costs. Accordingly, it is desirable to accurately distinguish an influx of formation fluid 246 into wellbore 12 from ballooning to avoid unnecessary and costly mitigation measures during a ballooning event.

However, it is typically difficult to distinguish ballooning from the influx of formation fluid 246 (e.g., influx at the early stages of a well control event). For example, both phenomena generally result in an increase in the return flow of fluid through wellbore 12, causing a corresponding increase in the volume of fluid in working fluid vessel 240. In existing wellbore systems, a human operator or analyst typically determines whether an observed increase in the flow of returning fluid is caused by influx or ballooning. The determination is often based on the intuition and/or experience of the human operator and therefore generally lacks repeatability and/or consistency (e.g., the determination is not based on a rule-based decision-making process). Given the uncertainty and the stakes involved, many human operators tend to err on the side of caution, identifying an increase in return flow as the result of influx when it may actually be the result of ballooning. The tendency to overcompensate may result in overbalanced wells (e.g., denser working fluid 242 than is needed to balance formation fluid 246), unnecessary well shut-ins and/or closures, and/or the like.

To address these challenges, wellbore system 200 may include a controller 270 for monitoring the ballooning potential of wellbore 12 (i.e., the total volume of ballooning volumes 244a-n). The ballooning potential corresponds to the amount of working fluid 242 that has temporarily escaped into formation 14 (and/or its constituent layers 18a-n) and has the potential to be returned to wellbore 12 at a later time. In response to detecting an increase in the return flow of working fluid 242, and based on the determined ballooning potential of wellbore 12, controller 270 may determine whether the increase in the return flow is caused by ballooning or the influx of formation fluid 246. Controller 270 may further communicate with processing system 250, composition controller 262, and/or blowout preventer 264 to adjust the composition of working fluid 242, seal wellbore 12, and/or the like.

In some embodiments, controller 270 may determine the ballooning potential of wellbore 12 using a rule-based approach that is more repeatable, accurate, and/or reliable than existing, intuition-based approaches performed by human analysts. Consequently, controller 270 may reduce the likelihood that ballooning events are mistaken for influx events, resulting in more efficient operation of wellbore system 200 (e.g., a lighter composition of working fluid 242 and/or fewer unnecessary shut-ins). Similarly, controller 270 may reduce the likelihood that influx events are mistaken for ballooning events, resulting in more efficient operation of wellbore system 200.

As depicted in FIGS. 2A-2C, controller 270 includes a processor 272 (e.g., one or more hardware processors). Generally, processor 272 may include one or more general purpose central processing units (CPUs). Additionally or alternately, processor 272 may include at least one processor that provides accelerated performance when evaluating neural network models. For example, processor 272 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general purpose CPU.

Controller 270 further includes a memory 274 (e.g., one or more non-transitory memories) coupled to processor 272. Memory 274 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 274 may store instructions that are executable by processor 272 to cause processor 272 to perform operations corresponding to processes disclosed herein and described in more detail below.

Processor 272 and/or memory 274 may be arranged in any suitable physical arrangement with respect to each other and/or with respect to other components of wellbore system 200. In some embodiments, processor 272 and/or memory 274 may be implemented on a same board, in a same package (e.g., system-in-package), on a same chip (e.g., system-on-chip), and/or the like. In some embodiments, processor 272 and/or memory 274 may include distributed, virtualized, and/or containerized computing resources. Consistent with such embodiments, processor 272 and/or memory 274 may be located in one or more data centers and/or cloud computing facilities. In some embodiments, processor 272 and/or memory 274 may be located on site (e.g., in the vicinity of wellbore 12), at a remote location (e.g., a cloud computing facility), in a mobile device, and/or the like.

In some embodiments, an operator 276 (e.g., one or more human operators) may interact with controller 270. For example, operator 276 may receive and/or view data from controller 270 and/or may provide instructions to controller 270. Consistent with such embodiments, controller 270 may interact with operator 276 via a display console, an input/output device (e.g., buttons, touch pad, touchscreen, mouse, joystick, etc.), a user interface, and/or the like.

In some embodiments, controller 270 may determine the ballooning potential of wellbore 12 based on characteristics of wellbore 12, formation 14 (and/or constituent layers 18a-n), wellbore system 200, and/or the like. Consistent with such embodiments, wellbore system 200 may include one or more sensors 280a-m that provide sensor data to controller 270. Sensors 280a-m may correspond to various types of monitoring, logging, and/or measurement devices and may be disposed in various locations. For example, sensors 280a-m may be positioned in and/or near wellhead (as illustrated by sensor 280a), in downhole locations (e.g., on drilling bit 230 and/or along drilling string 220, as illustrated by sensor 280b), in and/or near working fluid vessel 240 (as illustrated by sensor 280m), and/or the like. The sensor data provided by sensors 280a-m may correspond to measurement-while-drilling (MWD) data, logging-while-drilling (LWD) data, gamma ray logging data, resistivity data (e.g., deep, medium, and/or shallow resistivity data), acoustic and/or sonic logging data, working fluid composition data (e.g., mud logging data that identifies the composition of the return flow of working fluid 242 from wellbore 12), working fluid volume data (e.g., data that identifies the volume of working fluid 242 stored in working fluid vessel 240 and/or the return flow of working fluid 242 from wellbore 12), and/or the like. In some embodiments, controller 270 may receive data from sensors 280a-n in real-time (e.g., during drilling and/or production operations of wellbore system 200), during formation evaluation (e.g., on logging runs), and/or at various other times during the planning, operation, and/or operation of wellbore system 200. In some embodiments, controller 270 may receive various other information associated with wellbore 12, formation 14, and/or wellbore system 200, such as survey data (e.g., reports identifying the lithology and/or geology of formation 14), quantitative and/or qualitative data provided by human observers, and/or the like.

Figure 3:
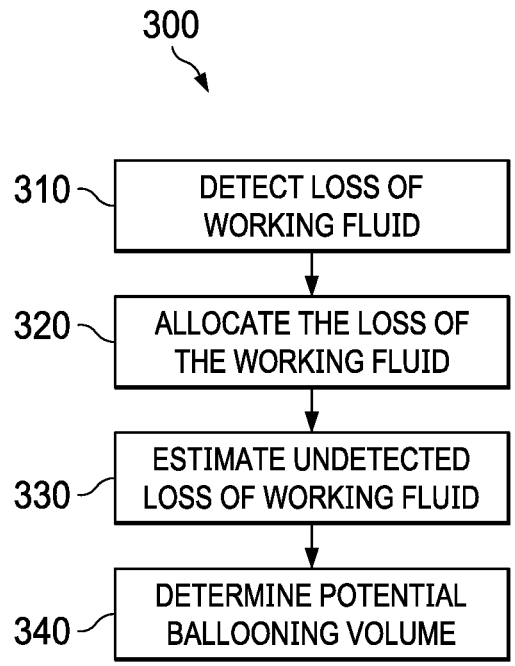
FIG. 3 illustrates a block diagram of a method for monitoring a ballooning potential of a wellbore according to some embodiments.

Turning to FIG. 3, shown is a block diagram of a method 300 for monitoring the ballooning potential of a wellbore according to some embodiments. In some embodiments, method 300 may be performed during operation of a wellbore system, such as wellbore system 200. Consistent with such embodiments, method 300 may be performed using a controller, such as controller 270. In some embodiments, method 300 may be performed repeatedly (e.g., at periodic intervals) during drilling and/or wellbore operation to maintain an up-to-date estimate of the ballooning potential of the wellbore. Additionally or alternately, method 300 may be performed during a post mortem assessment of a wellbore, e.g., to determine the ballooning potential of a shut in well to evaluate whether the well closure was justified.

At a process 310, a loss of working fluid, such as working fluid 242, is detected. For example, the loss of working fluid may be determined based on sensor data (e.g., monitoring and/or sensor data associated with processing system 250 and/or sensors 280a-m). In some embodiments, the loss of working fluid may be detected during circulation of the working fluid (e.g., while drilling is occurring and working fluid is being pumped to the drilling bit). In particular, the loss of working fluid may be detected when the return flow rate of working fluid from the wellbore is less than that of the working fluid being pumped down the wellbore (or the return flow rate drops below a predetermined threshold), and/or when the volume of working fluid stored in the working fluid vessel, such as working fluid vessel 240, decreases or drops below a predetermined threshold.

At a process 320, the detected loss is allocated. In particular, the loss may be allocated to the wellbore itself (the capacity of which may vary due to variation in the shape of the wellbore over time), to fluid invasion of the working fluid into the formation (and/or constituent layers thereof, such as layers 218a-n), and/or the like. In some embodiments, the volume of loss allocated to the wellbore may be determined according to the following equation (scaling and/or unit conversion factors omitted for clarity):

$$V_{wellbore} = \pi r_{wellbore}^2 h_{wellbore} \quad \text{(Eq. 1)}$$

where $V_{wellbore}$ denotes the volume of loss allocated to the wellbore, $r_{wellbore}$ denotes the radius of the wellbore, and $h_{wellbore}$ denotes the height of the wellbore. When wellbore deformation is detected (or the shape of the wellbore otherwise changes), Equation 1 may be modified as follows:

$$\Delta V_{wellbore} = \pi h_{wellbore}[(r_{wellbore} + \Delta r)^2 - r_{wellbore}] \quad \text{(Eq. 2)}$$

where $\Delta V_{wellbore}$ denotes the change in volume of loss allocated to the wellbore, and $\Delta r$ denotes the change in radius of the wellbore.

The remaining loss of working fluid may be allocated to the formation and/or to a particular layer of the formation. In particular, the loss may be allocated to a layer based on the porosity of the layer, where the porosity may be determined based on the lithology of the layer. When loss is allocated to one or more layers of the underground formation, a corresponding radius of invasion (i.e., a distance into the formation that is occupied by the lost fluid, sometimes referred to as a "thief zone") may be determined. In some embodiments, the radius of invasion of a given layer of the formation may be determined according to the following equation (scaling and/or unit conversion factors omitted for clarity):

$$r_{layer} = \sqrt{\frac{V_{layer}}{\pi h_{layer} P_{layer}} + r_{wellbore}^2} - r_{wellbore} \quad \text{(Eq. 3)}$$

where $r_{layer}$ denotes the radius of invasion, $V_{layer}$ denotes the volume of loss allocated to the layer, $h_{layer}$ denotes the height of the layer, and $P_{layer}$ denotes the porosity of the layer. In some embodiments, the estimate for the radius of invasion obtained by Eq. 3 may be matched against sensor data (e.g., resistivity readings and/or gamma ray readings) to verify the allocation of the loss. To the extent that the sensor data suggests a different radius of invasion than Equation 3, the loss may be allocated to a different layer of the formation to obtain a better fit. In this manner, the loss may be allocated iteratively among the layers of the formation.

In some embodiments, the loss may be allocated using a statistical model, a rule-based model (e.g., a decision tree), a neural network model, and/or the like. For example, a neural network model may be trained using a supervised learning process based on one or more of lithology data of the wellbore being drilled, sensor data (e.g., resistivity data and/or gamma ray data, and/or other sensor data) of the wellbore being drilled, lithology data of other wellbores previously drilled, sensor data from other wellbores previously drilled to predict one or more formation layers associated with the wellbore being drilled and to which a loss should be allocated.

At a process 330, an undetected loss of working fluid may be estimated. In some embodiments, the sensitivity of sensors and/or other measurement approaches used to detect working fluid losses at process 310 may be such that some working fluid losses are undetected. For example, small amounts of working fluid may be lost to microfractures in the formation and may not be detected at process 310. In some embodiments, the volume of undetected working fluid loss may be estimated based on resistivity data. For example, the resistivity data may be used to estimate the width of planar fractures and/or microfractures in the formation, the radius of invasion into a porous layer of the formation, and/or the like. In some embodiments, deep and shallow resistivity measurements may be received. When the deep and shallow resistivity measurements converge, the resistivity data may be used to estimate the undetected loss of working fluid. When the deep and shallow resistivity measurements do not converge, other approaches may be used to estimate the undetected working fluid loss, such as receiving an estimate from an operator (e.g., operator 276). Like the detected working fluid loss from process 310, the undetected loss may be allocated among various layers of the formation. In some embodiments, the undetected loss may be estimated and/or allocated using a statistical model, a rule-based model (e.g., a decision tree), a neural network model, and/or the like. For example, a neural network model may be trained using a supervised learning process to predict a volume of the undetected loss based on input features such as sensor data, lithology data, and/or the like. Similarly, a neural network model may be trained using a supervised learning process to predict a formation layer to which the undetected loss should be allocated based on input features such as sensor data, lithology data, and/or the like.

At a process 340, a ballooning potential is determined based on the allocation of detected and undetected working fluid losses from processes 310-330. That is, based on the allocation of working fluid losses and estimate of undetected losses, the volume of working fluid that has the potential to be returned to the wellbore from the formation at a later time is determined. In some embodiments, the ballooning potential may be based on the lithology of the formation layers in which working fluid losses are allocated. For example, formation layers that are elastic and/or brittle (e.g., shale formations) may have the potential to return a large portion of lost working fluids to the wellbore. Other types of formation layers (e.g., limestone, dolomite, etc.) may return a smaller portion of the lost working fluids allocated to such layers. Working fluid losses allocated to the wellbore and/or to wellbore deformations may also be included in the ballooning potential, including working fluid losses allocated to wellbore breathing.

It is to be understood that FIG. 3 is illustrative, and that various alternatives are possible. For example, an operator, such as operator 376, may be responsible for estimating and/or allocating working fluid loss. To illustrate, method 300 may include a process of providing a request to allocate lost working fluid to the operator (e.g., via a user interface of the controller) in response to detecting a loss of working fluid at process 310. Method 300 may then include a process of receiving an allocation of the loss of working fluid from the operator (e.g., via the user interface of the controller) to one or more formation layers. Additionally or alternately, method 300 may include a process of receiving an estimate and/or allocation of an undetected loss of working fluid from the operator. In either case, method 300 may then proceed to process 340 for determining and/or updating the ballooning potential based on the received estimate and/or allocation of loss provided by the operator.

Figure 4:
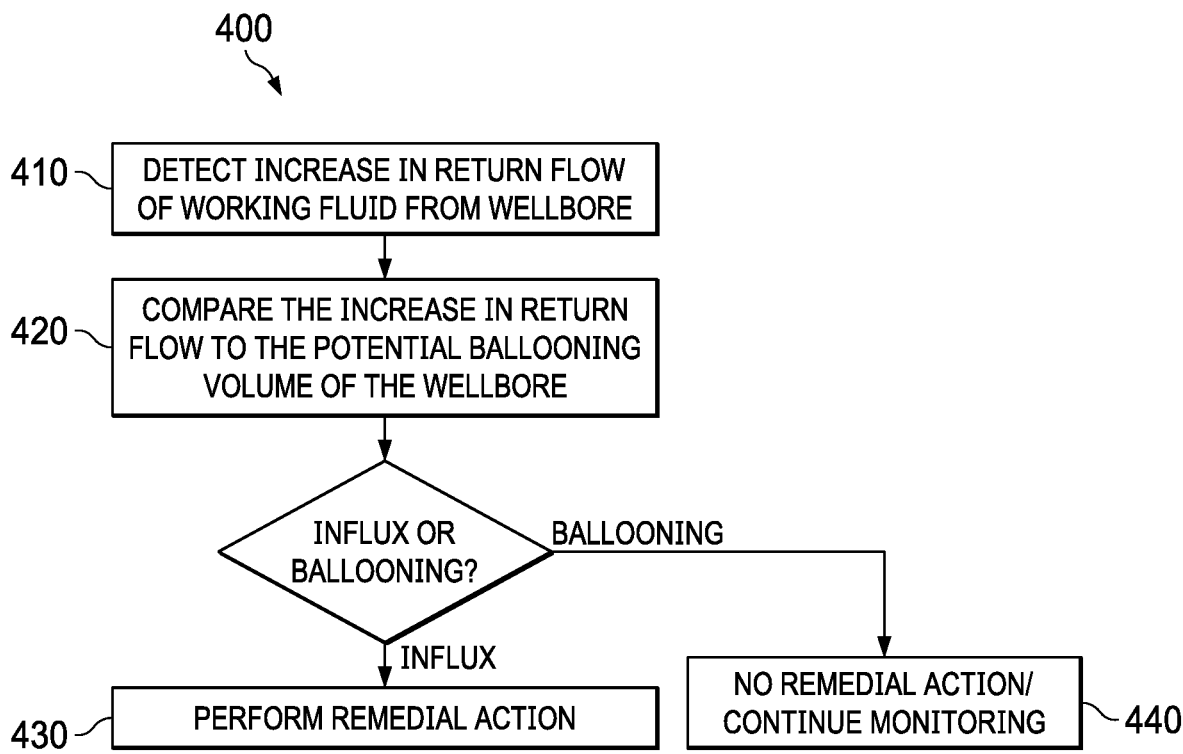
FIG. 4 illustrates a block diagram of a method for operating a wellbore system according to some embodiments.

Turning to FIG. 4, shown is a block diagram of a method 400 for operating a wellbore system, such as wellbore system 200, according to some embodiments. In some embodiments consistent with FIGS. 1-3, method 400 may be performed using a controller, such as controller 270.

At a process 410, an increase in the return flow of working fluid, such as working fluid 242, from the wellbore is detected. In some embodiments, the increase in the return flow may be detected based on sensor and/or monitoring data, e.g., data received from processing system 250 and/or sensors 280a-m. For example, an increase in the stored volume of the working fluid in a working fluid source, such as working fluid vessel 240, may be detected.

At a process 420, the increase in the return flow is compared to a ballooning potential of the wellbore to determine whether the increase in the return flow is due to ballooning or an influx of formation fluid. In some embodiments consistent with FIG. 3, the ballooning potential of the wellbore may be determined using method 300. When the increase in the return flow exceeds the ballooning potential of the wellbore, it may be determined that the increase in return flow is due to influx of formation fluid into the wellbore. In this case, method 400 may proceed to a process 430 for taking a remedial action in response to the influx. Such remedial action may include increasing the density of the drilling fluid, changing the drilling, stopping drilling, activating the blowout preventer, activating other valves, changing a pumping parameter, and the like. When the increase in the return flow is less than the ballooning potential of the wellbore, it may be determined that the increase in return flow is due to ballooning. In this case, method 400 may proceed to a process 440 in which no remedial action is taken and/or in which monitoring of the return flow continues to ensure that the observed return flow remains consistent with ballooning. For example, process 440 may include notifying the operator of the wellbore system that the increase in the return flow is due to ballooning.

At a process 430, a remedial action is performed in response to determining that the increase is due to the influx of formation fluid. For example, the remedial action may be intended to prevent and/or mitigate the risk of a well control event, such as a blowout. In some embodiments, the remedial action may include providing a signal to a composition controller, such as composition controller 262, to cause the composition controller to increase the density of the working fluid. In some embodiments, the remedial action may include providing a signal to a blowout preventer, such as blowout preventer 264, to cause the blowout preventer to seal the wellbore. In some embodiments, the remedial action may include providing an alert to an operator, such as operator 276, indicating that an influx is detected to allow the operator to take appropriate action.

Thus method for operating a wellbore system having a working fluid circulating therethrough has been described. The method may include detecting a loss of the working fluid; allocating the loss to one or more layers of the underground formation; determining a ballooning potential of the wellbore based on the allocated loss and a lithology of the one or more layers of the underground formation; detecting an increase in a return flow of the working fluid from the wellbore; comparing the increase in the return flow to the ballooning potential of the wellbore to determine whether the increase in the return flow is due to an influx of formation fluid into the wellbore; and taking a remedial action in response to determining that the increase in the return flow is due to the influx of the formation fluid. In other embodiments, the method may include introducing a working fluid into a wellbore; recovering working fluid from a wellbore; detecting a loss of the working fluid; allocating the loss to one or more layers of the underground formation; determining a ballooning potential of the wellbore based on the allocated loss and a lithology of the one or more layers of the underground formation; detecting an increase in a return flow of the working fluid from the wellbore; and comparing the increase in the return flow to the ballooning potential of the wellbore to determine whether the increase in the return flow is due to an influx of formation fluid into the wellbore. Still yet other embodiments of the method may include detecting a loss of working fluid introduced into a wellbore; allocating the loss to one or more layers of the underground formation; determining a ballooning potential of the wellbore based on the allocated loss and a lithology of the one or more layers of the underground formation; detecting an increase in a return flow of the working fluid from the wellbore; and comparing the increase in the return flow to the ballooning potential of the wellbore to determine whether the increase in the return flow is due to an influx of formation fluid into the wellbore.

Likewise, a wellbore system for drilling a wellbore in an underground formation has been described. The wellbore system may include a non-transitory memory; and one or more hardware processors coupled to the non-transitory memory and configured to execute instructions to cause the wellbore system to perform operations, which operations may include detecting a loss of a drilling fluid of the wellbore system, the drilling fluid circulating through the wellbore during drilling operation; allocating the loss to one or more layers of the underground formation; determining a ballooning potential of the wellbore based on the allocated loss, the ballooning potential corresponding to a potential for the allocated loss to be returned to the wellbore from the underground formation; detecting an increase in a return flow of the drilling fluid from the wellbore; and comparing the increase in the return flow to the ballooning potential to determine whether the increase in the return flow is due to an influx of formation fluid into the wellbore. Similarly, a non-transitory machine-readable medium having stored thereon machine-readable instructions executable to cause a wellbore system to perform operations is provided. The operations may include receiving, from an operator of the wellbore system, an estimated loss of a working fluid of the wellbore system, the working fluid being circulated through a wellbore during operation of the wellbore system; receiving, from the operator, an allocation of the estimated loss to one or more layers of an underground formation through which the wellbore extends; determining a ballooning potential of the wellbore based on the allocation of the estimated loss, the ballooning potential corresponding to a potential for the estimated loss to be returned to the wellbore from the underground formation; detecting an increase in a return flow of the working fluid from the wellbore; comparing the increase in the return flow to the ballooning potential to determine whether the increase in the return flow is due to ballooning; and in response to determining that the increase in the return flow is due to ballooning, notifying the operator that the increase in the return flow is due to ballooning.

For any one of the forgoing embodiments, one or more of the following steps and elements may be included, alone or in combination with other steps and elements:

Adjusting the introduction of working fluid into the wellbore based on the determination as to whether the increase in the return flow is due to an influx of formation fluid into the wellbore.

Adjusting the introduction of working fluid into the wellbore based on the determination as to whether the increase in the return flow is due to an influx of formation fluid into the wellbore, wherein the adjustment comprises increasing the density of the working fluid introduced into the wellbore.

Taking a remedial action in response to determining that the increase in the return flow is due to the influx of the formation fluid.

The loss is detected utilizing sensors deployed in the wellbore.

The loss is detected based on the recovered working fluid.

Introducing a working fluid into a wellbore; and recovering working fluid from a wellbore;

Taking a remedial action in response to determining that the increase in the return flow is due to the influx of the formation fluid.

Taking a remedial action in response to determining that the increase in the return flow is due to the influx of the formation fluid, wherein the remedial action is adjusting the introduction of working fluid into the wellbore based on the determination as to whether the increase in the return flow is due to an influx of formation fluid into the wellbore.

Taking a remedial action in response to determining that the increase in the return flow is due to the influx of the formation fluid, wherein the remedial action is operating a blowout preventer to seal the wellbore.

The loss of the working fluid is detected based on a decrease in a volume of the working fluid at a working fluid source.

The loss is allocated to the one or more layers of the underground formation based on an estimated radius of invasion about the wellbore of the working fluid into the one or more layers of the underground formation.

The estimated radius of invasion is based on a porosity of the one or more layers of the underground formation.

The loss is allocated to the one or more layers of the underground formation using a neural network model, the neural network model being trained according to a supervised learning process to predict the one or more layers based on at least one of resistivity data or gamma ray data acquired from one or more sensors of the wellbore system.

The ballooning potential is determined based on an elasticity corresponding to the lithology of the one or more layers.

Estimating an undetected loss of working fluid and allocating the undetected loss to one or more second layers of the underground formation, wherein the ballooning potential of the wellbore is further based on the undetected loss and a lithology of the one or more second layers of the underground formation.

The undetected loss is estimated based on resistivity data when a deep resistivity measurement and a shallow resistivity measurement converge.

The remedial action includes increasing a density of the working fluid.

The remedial action includes sealing the wellbore.

Ballooning potential is repeatedly updated during operation of the wellbore system.

The loss is allocated based on a porosity of the one or more layers of the underground formation.

The loss is allocated based on at least one of resistivity data or gamma ray data acquired from one or more sensors of the wellbore system.

The ballooning potential is determined based on an elasticity of the one or more layers.

The remedial action is selected from the group consisting of increasing a density of the drilling fluid or sealing the wellbore.

The estimated loss corresponds to an estimate of an undetected loss of working fluid.

The increase in the return flow is determined to be due to ballooning when the increase in the return flow is less than the ballooning potential.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A computer-implemented method for operating a wellbore system for producing hydrocarbons from a wellbore in an underground formation, the wellbore system including a working fluid that circulates through the wellbore during operation, the method comprising:

detecting a loss of working fluid introduced into a wellbore;

estimating a radius of invasion about the wellbore of the working fluid into one or more layers of the underground formation;

allocating the loss to the one or more layers of the underground formation, based on the estimated radius of invasion;

determining a ballooning potential of the wellbore based on the allocated loss and a lithology of the one or more layers of the underground formation;

detecting an increase in a return flow of the working fluid from the wellbore;

comparing the increase in the return flow to the ballooning potential of the wellbore to determine whether the increase in the return flow is due to an influx of formation fluid into the wellbore; and taking a remedial action in response to determining that the increase in the return flow is due to the influx of the formation fluid.

2. The method of claim 1, wherein the loss of the working fluid is detected based on a decrease in a volume of the working fluid at a working fluid source.

3. The method of claim 1, wherein the estimated radius of invasion is matched against at least one of resistivity data or gamma ray data acquired from one or more sensors of the wellbore system to verify the loss of the working fluid allocated to the one or more layers of the underground formation.

4. The method of claim 3, wherein the estimated radius of invasion is based on a porosity of the one or more layers of the underground formation.

5. The method of claim 4, wherein the loss is allocated to the one or more layers of the underground formation using a neural network model, the neural network model being trained according to a supervised learning process to predict the one or more layers based on at least one of the resistivity data or the gamma ray data acquired from the one or more sensors of the wellbore system.

6. The method of claim 4, wherein the ballooning potential is determined based on an elasticity corresponding to the lithology of the one or more layers.

7. The method of claim 1, further comprising estimating an undetected loss of working fluid and allocating the undetected loss to one or more second layers of the underground formation, wherein the ballooning potential of the wellbore is further based on the undetected loss and a lithology of the one or more second layers of the underground formation.

8. The method of claim 7, wherein the undetected loss is estimated based on resistivity data when a deep resistivity measurement and a shallow resistivity measurement converge.

9. The method of claim 1, wherein the remedial action includes increasing a density of the working fluid.

10. The method of claim 1, wherein the remedial action includes sealing the wellbore.

11. The method of claim 1, wherein the remedial action is at least one of increasing a density of the working fluid or sealing the wellbore.

12. The method of claim 1, wherein the ballooning potential is repeatedly updated during operation of the wellbore system.

13. A wellbore system for drilling a wellbore in an underground formation, the wellbore system comprising:

a non-transitory memory; and one or more hardware processors coupled to the non-transitory memory and configured to execute instructions to cause the wellbore system to perform operations comprising:
detecting a loss of a drilling fluid of the wellbore system, the drilling fluid circulating through the wellbore during a drilling operation;
determining a porosity of one or more layers of the underground formation;
allocating the loss to the one or more layers of the underground formation, based on the porosity of the one or more layers of the underground formation;
determining a ballooning potential of the wellbore based on the allocated loss, the ballooning potential corresponding to a potential for the allocated loss to be returned to the wellbore from the underground formation;
detecting an increase in a return flow of the drilling fluid from the wellbore;
comparing the increase in the return flow to the ballooning potential to determine whether the increase in the return flow is due to an influx of formation fluid into the wellbore; and
taking a remedial action in response to determining that the increase in the return flow is due to the influx of the formation fluid.

14. The wellbore system of claim 13, wherein the porosity is determined based on a lithology of the one or more layers of the underground formation.

15. The wellbore system of claim 13, wherein the loss is further allocated based on at least one of resistivity data or gamma ray data acquired from one or more sensors of the wellbore system.

16. The wellbore system of claim 13, wherein the ballooning potential is determined based on an elasticity of the one or more layers.

17. The wellbore system of claim 13, wherein the remedial action includes one or more of increasing a density of the drilling fluid or sealing the wellbore.

18. A non-transitory machine-readable medium having stored thereon machine-readable instructions executable to cause a wellbore system to perform operations comprising:
receiving, from an operator of the wellbore system, an estimated loss of a working fluid of the wellbore system, the working fluid being circulated through a wellbore during operation of the wellbore system, wherein the estimated loss corresponds to an estimate of an undetected loss of the working fluid;
receiving, from the operator, an allocation of the estimated loss to one or more layers of an underground formation through which the wellbore extends;
determining a ballooning potential of the wellbore based on the allocation of the estimated loss, the ballooning potential corresponding to a potential for the estimated loss to be returned to the wellbore from the underground formation;
detecting an increase in a return flow of the working fluid from the wellbore;
comparing the increase in the return flow to the ballooning potential to determine whether the increase in the return flow is due to ballooning;
in response to determining that the increase in the return flow is due to ballooning, notifying the operator that the increase in the return flow is due to ballooning; and
taking a remedial action in response to determining that the increase in the return flow is due to an influx of formation fluid into the wellbore and not due to ballooning.

19. The non-transitory machine-readable medium of claim 18, wherein the undetected loss of the working fluid is estimated based on resistivity data when a deep resistivity measurement and a shallow resistivity measurement converge.

20. The non-transitory machine-readable medium of claim 18, wherein the increase in the return flow is determined to be due to ballooning when the increase in the return flow is less than the ballooning potential.

* * * * *